July 5, 1927.
H. O. RUSSELL ET AL
GUN SIGHT FOR NIGHT USE
Filed April 18, 1922
1,635,059
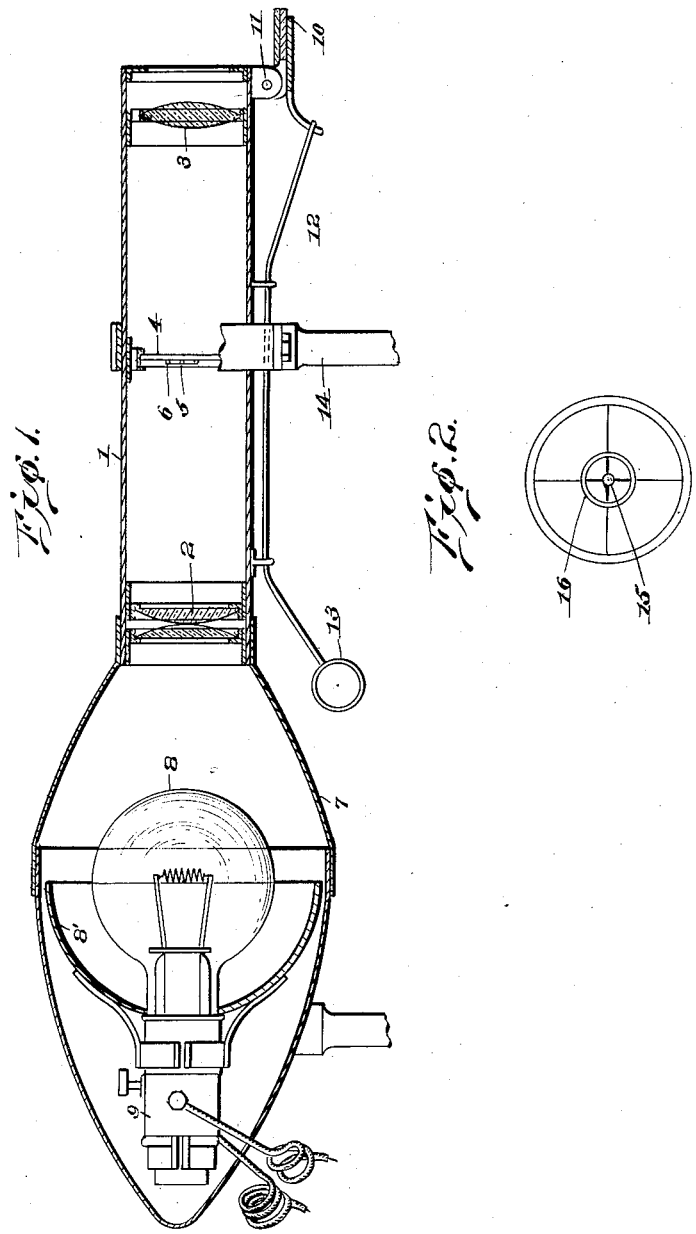
Inventors
Herbert O. Russell
Charles Leigh Paulus
By Robert H. Young Atty Patented July 5, 1927.

1,635,059

UNITED STATES PATENT OFFICE.

HERBERT O. RUSSELL, OF PARLIER, CALIFORNIA, AND CHARLES LEIGH PAULUS, OF DAYTON, OHIO.

GUN SIGHT FOR NIGHT USE.

Application filed April 18, 1922. Serial No. 555,423.

This invention relates to gun sights for use at night, the improved gun sight being especially designed to be used upon an airplane while in flight.

To the above end, the invention consists in the novel construction, combination and arrangement herein fully described, illustrated and claimed.

In the accompanying drawings:

Figure 1 is a longitudinal section through the complete sight.

Figure 2 is a diagram of the shadow projected by the reticule of the sight.

Referring to the drawings, Figure 1 designates the lens tube containing at the rear end thereof a condensing lens 2 and carrying in the forward end a focusing lens 3. Arranged between the lens 2 and the lens 3 is a target reticule 4, which embodies a central opaque portion 5, and an annular opaque portion or ring 6, the remainder of the reticule being transparent.

To the rear end of the lens tube 1, there is attached a lamp casing 7, containing an electric lamp 8, lamp socket 9 and reflector 8'.

At the forward end of the lens tube 1 there is arranged a shutter 10, connected to the tube by pivot 11 and capable of being operated by suitable operating connection 12, having at its rear end an operating handle or ring 13. The casing 7 and the lens tube 1 together form a housing for the device, the latter being mounted upon suitable support 14.

The instrument projects the rays of light so that at a distance of substantially two-hundred yards, a ring shadow six feet wide and substantially seventy-six feet inside diameter and also a central spot or shadow six feet in diameter will be cast upon the target. All the space between the central spot and the outside ring is lighted. In Figure 2 the central dark spot, indicated at 15 and the ring at 16. By means of the expedient above described the proper deflection may be obtained to enable the gunner to fire ahead of the enemy when fighting at night.

Having thus described our invention, we claim:

1. A gun sight for night use embodying a source of light, a condensing lens, a focusing lens, and a target reticule between the condensing lens and focusing lens, said reticule having a central opaque portion and a second encircling opaque portion in spaced relation to said first mentioned portion adapted to produce at a distance a dark central spot and a dark circle surrounding said spot, a suitable casing for said parts, and a shutter at the end of said casing.

2. A gun sight for night use including a casing having a source of light therein, a condensing lens in the casing, a focusing lens in the casing and a target reticule between said lenses comprising a central opaque portion and a second encircling opaque portion in spaced relation to the first mentioned portion to produce at a distance in cooperation with said lenses and said source of light, a dark central spot and a dark circle surrounding said spot in spaced relation thereto.

In testimony whereof we affix our signature.

HERBERT O. RUSSELL.
CHARLES LEIGH PAULUS.